United States Patent
Murata et al.

(10) Patent No.: US 10,471,802 B2
(45) Date of Patent: Nov. 12, 2019

(54) WORK VEHICLE AND OPERATOR'S COMPARTMENT UNIT

(71) Applicant: KOMATSU LTD., Tokyo (JP)

(72) Inventors: Kazuhiro Murata, Hirakata (JP); Akihide Namura, Hirakata (JP); Shota Suzuki, Hirakata (JP)

(73) Assignee: KOMATSU LTD., Tokyo (JP)

( * ) Notice: Subject to any disclaimer, the term of this patent is extended or adjusted under 35 U.S.C. 154(b) by 308 days.

(21) Appl. No.: 15/311,591

(22) PCT Filed: Aug. 10, 2016

(86) PCT No.: PCT/JP2016/073605
§ 371 (c)(1),
(2) Date: Nov. 16, 2016

(87) PCT Pub. No.: WO2018/029821
PCT Pub. Date: Feb. 15, 2018

(65) Prior Publication Data
US 2018/0178616 A1     Jun. 28, 2018

(51) Int. Cl.
*B60H 1/00* (2006.01)
*B60H 3/06* (2006.01)
*B62D 33/06* (2006.01)
*B66C 13/54* (2006.01)
*E02F 9/16* (2006.01)

(52) U.S. Cl.
CPC ....... *B60H 1/00378* (2013.01); *B60H 3/0641* (2013.01); *B62D 33/0617* (2013.01); *B66C 13/54* (2013.01); *E02F 9/16* (2013.01)

(58) Field of Classification Search
CPC ........ B60H 1/00378; B60H 1/32; B60H 3/06; B60H 3/0641; B62D 33/0617; B66C 13/54
USPC .......................... 296/190.01, 190.08, 190.09
See application file for complete search history.

(56) References Cited

U.S. PATENT DOCUMENTS

| | | | |
|---|---|---|---|
| 6,279,978 B1 * | 8/2001 | Schreyer | B60H 1/247 296/190.03 |
| 7,252,585 B2 * | 8/2007 | Ichikawa | B60H 1/00378 454/137 |
| 2004/0194488 A1 | 10/2004 | Kamimae et al. | |
| 2005/0178136 A1 | 8/2005 | Hara et al. | |
| 2006/0186224 A1 | 8/2006 | Yoshii et al. | |
| 2011/0250832 A1 | 10/2011 | Mayr et al. | |
| 2016/0107500 A1 | 4/2016 | Ichikawa | |

FOREIGN PATENT DOCUMENTS

| | | |
|---|---|---|
| JP | H02-10113 U | 1/1990 |
| JP | H08-253020 A | 10/1996 |
| JP | 2006-264671 A | 10/2006 |
| JP | 2007-308028 A | 11/2007 |

(Continued)

*Primary Examiner* — Joseph D. Pape
(74) *Attorney, Agent, or Firm* — Drinker Biddle & Reath LLP (57) ABSTRACT

An operator's compartment has an internal space. A case has an internal space in communication with the internal space of the operator's compartment. An air conditioning unit is disposed in the internal space of the case and has an internal-air supply port which introduces air from the internal space. An internal-air filter is attached to the internal-air supply port.

8 Claims, 7 Drawing Sheets

(56) References Cited

FOREIGN PATENT DOCUMENTS

| | | |
|---|---|---|
| JP | 2008-037277 A | 2/2008 |
| JP | 2012-062624 A | 3/2012 |
| JP | 2013-126876 A | 6/2013 |
| WO | WO 2015/159248 A1 | 10/2015 |

* cited by examiner

WORK VEHICLE AND OPERATOR'S COMPARTMENT UNIT

TECHNICAL FIELD

The present invention relates to a work vehicle and an operator's compartment unit, and particularly to a work vehicle and operator's compartment unit that has an air conditioning unit.

BACKGROUND ART

An air conditioning unit for an operator's compartment of a work vehicle has a door for switching between internal air and external air, a fan, an evaporator, a heater core, etc. The fan introduces internal air and external air into the air conditioning unit and sends the air to the evaporator and the heater core, and then delivers the air to an internal space of the operator's compartment. This conditions the air in the internal space of the operator's compartment. Such an air conditioning unit is disclosed in Japanese Patent Laying-Open No. 2013-126876 (PTD 1), for example.

CITATION LIST

Patent Document

PTD 1: Japanese Patent Laying-Open No. 2013-126876

SUMMARY OF INVENTION

Technical Problem

In the above described air conditioning unit, the pressure of the internal space of a case where the air conditioning unit is accommodated may have a negative pressure relative to external air pressure. In such a case, together with external air, dust enters the case and accumulates in the case. The accumulated dust may affect the air conditioning unit.

The present invention has been made in view of the above issue, and an object thereof is to provide a work vehicle and operator's compartment unit which can suppress an effect of dust on an air conditioning unit.

Solution to Problem

A work vehicle of the present invention includes an operator's compartment, a case, an air conditioning unit, and an internal-air filter. The operator's compartment has a first internal space. The case has a second internal space in communication with the first internal space. The air conditioning unit is disposed in the second internal space of the case and has an internal-air supply port which introduces air from the second internal space. The internal-air filter is attached to the internal-air supply port.

According to the work vehicle of the present invention, the internal-air filter is attached to the internal-air supply port of the air conditioning unit. Accordingly, an interior of the air conditioning unit downstream of the internal-air supply port of the air conditioning unit with the filter attached will have a negative pressure. However, the first internal space and the second internal space are in communication with each other, and a filter is not disposed between the first internal space and the second internal space. Accordingly, the pressure of the second internal space is substantially equal to the pressure of the first internal space and does not become a negative pressure relative to external air pressure. This suppresses entering of dust into the second internal space together with external air. This can in turn suppress a negative effect on the air conditioning unit of dust otherwise entering the second internal space.

In the above work vehicle, the case is disposed outside the first internal space of the operator's compartment. The internal-air filter is disposed opposite to the operator's compartment with respect to the air conditioning unit.

This facilitates accessing the internal-air filter from outside the operator's compartment and hence facilitates maintenance. Furthermore, there is no need to access the internal-air filter from the first internal space of the operator's compartment, and the first internal space can be utilized efficiently.

In the above work vehicle, the operator's compartment has a rear window. The air conditioning unit is disposed below the rear window.

As the rear window is disposed above the air conditioning unit, the operator in the operator's compartment can have a satisfactory rear view through the rear window.

In the above work vehicle, an internal-air opening connecting the first internal space and the second internal space and being open to the first internal space is open upward in the first internal space.

Such an internal-air opening is open upward in the first internal space. This can suppress entering of dust that is accumulated on the floor of the first internal space located below the internal-air opening from the first interior space through the internal-air opening into the second internal space.

In the above work vehicle, an accommodation portion having a third internal space is further comprised. The first internal space and the second internal space are in communication with each other via the third internal space.

This allows the accommodation portion to be disposed in the first internal space of the operator's compartment and the first internal space to be utilized efficiently.

In the above work vehicle, the air conditioning unit has an external-air supply port to introduce air from outside the case, and an external-air filter attached to the external-air supply port. A cover covering the external-air filter and having an external-air opening is further comprised. An upper end position of the external-air opening of the cover is located below a lower end position of the external-air filter.

As the upper end position of the external-air opening of the cover is located below the lower end position of the external-air filter, dust accumulated over the case less easily enters toward the external-air filter through the external-air opening.

In the above work vehicle, the air conditioning unit includes a plurality of air conditioning devices.

Thus, in a large-scale work vehicle including a plurality of air conditioning devices, an effect of dust on the air conditioning unit can be suppressed.

An operator's compartment unit of the present invention includes an operator's compartment, a case, an air conditioning unit, and an internal-air filter. The operator's compartment has a first internal space. The case is disposed outside the operator's compartment and has a second internal space in communication with the first internal space. The air conditioning unit is disposed in the second internal space of the case and has an internal-air supply port which introduces air from the second internal space. The internal-air filter is attached to the internal-air supply port.

The operator's compartment unit of the present invention can suppress an effect of dust on the air conditioning unit.

Advantageous Effect of Invention

The present invention can thus implement a work vehicle and operator's compartment unit which can suppress an effect of dust on an air conditioning unit.

DESCRIPTION OF EMBODIMENTS

The present invention will now be described in embodiments hereinafter with reference to the drawings.

Initially, a configuration of a work vehicle in one embodiment of the present invention will be described. Hereinafter, a hydraulic excavator will be described using FIG. 1 as one example of a work vehicle to which an idea of the present invention is applicable. Note that other than the hydraulic excavator, the present invention is also applicable to a crawler dozer, a wheel loader and a similar work vehicle having an air conditioning unit. in the following description, "upper," "lower," "front," "rear," "right," and "left" indicate directions with reference to an operator seated on an operator's seat 31e of operator's compartment 31.

Figure 1:
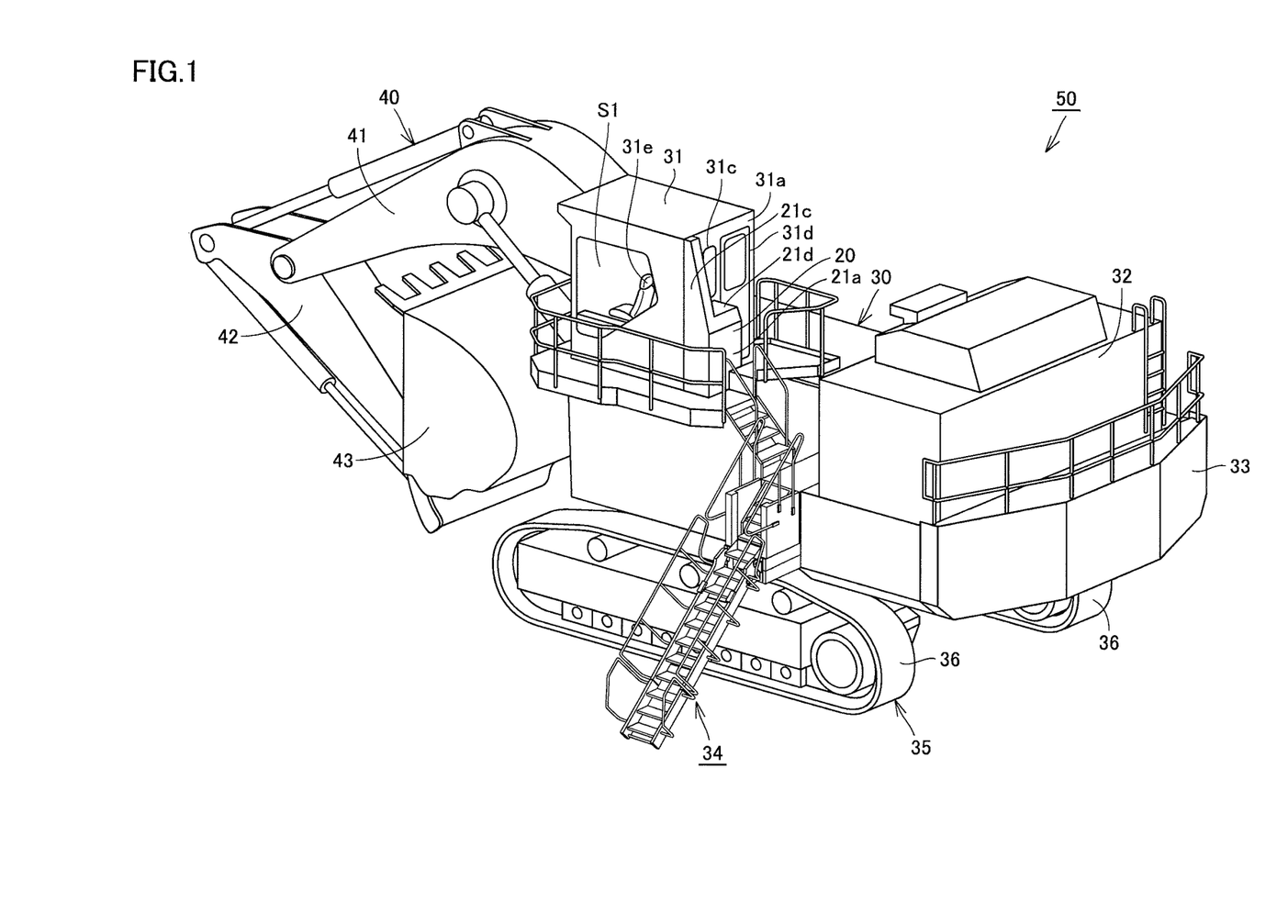
FIG. 1 is a perspective view schematically showing a configuration of a hydraulic excavator as an example of a work vehicle in one embodiment of the present invention.

FIG. 1 is a perspective view schematically showing a configuration of a hydraulic excavator as an example of a work vehicle in one embodiment of the present invention. As shown in FIG. 1, a hydraulic excavator 50 in the present embodiment is a large-size hydraulic excavator and mainly has a traveling unit 35, a revolving unit 30, and a work implement 40. A body of the work vehicle is composed of traveling unit 35 and revolving unit 30.

Traveling unit 35 has a pair of right and left crawler belt apparatuses 36. The paired right and left crawler belt apparatuses 36 each has a crawler belt. Hydraulic excavator 50 is self-propelled by the pair of right and left crawler belts being rotatably driven, Revolving unit 30 is provided to be revolvable as desired relative to traveling unit 35. This revolving unit 30 mainly has an operator's compartment 31, an engine room 32, a counter weight 33, and an access system 34.

Operator's compartment 31 is disposed on a front and left side of revolving unit 30 (a front side of the vehicle). An operator's seat 31e for an operator to be seated thereon is disposed in an internal space of operator's compartment 31. An air conditioner part 20 is disposed outside and behind operator's compartment 31. An operator's compartment unit is composed of operator's compartment 31 and air conditioner part 20.

Engine room 32 and counter weight 33 are disposed behind revolving unit 30 (i.e., on a rear side of the vehicle). Engine room 32 has an engine unit (an engine, an exhaust gas processing structure, etc.) accommodated therein. Over engine room 32, an engine hood covers engine room 32. Counter weight 33 is disposed behind engine room 32.

Access system 34 is disposed on a lateral side of revolving unit 30, e.g., a left side thereof. This access system 34 is provided to allow an operator to enter operator's compartment 31 from the ground and descend from operator's compartment 31 to the ground.

Work implement 40 is axially supported on a front side of revolving unit 30. Work implement 40 has a boom 41, a dipper stick 42, a bucket 43, a hydraulic cylinder, etc., for example. A proximal end of boom 41 is rotatably coupled to revolving unit 30. A proximal end of dipper stick 42 rotatably is coupled to a distal end of boom 41. Bucket 43 is rotatably coupled to a distal end of dipper stick 42. Boom 41, dipper stick 42 and bucket 43 can each be driven by the hydraulic cylinder to drive work implement 40.

Hereinafter, a configuration of the operator's compartment unit composed of operator's compartment 31 and air conditioner part 20 in the present embodiment will be described using FIG. 1-FIG. 6.

Figure 2:
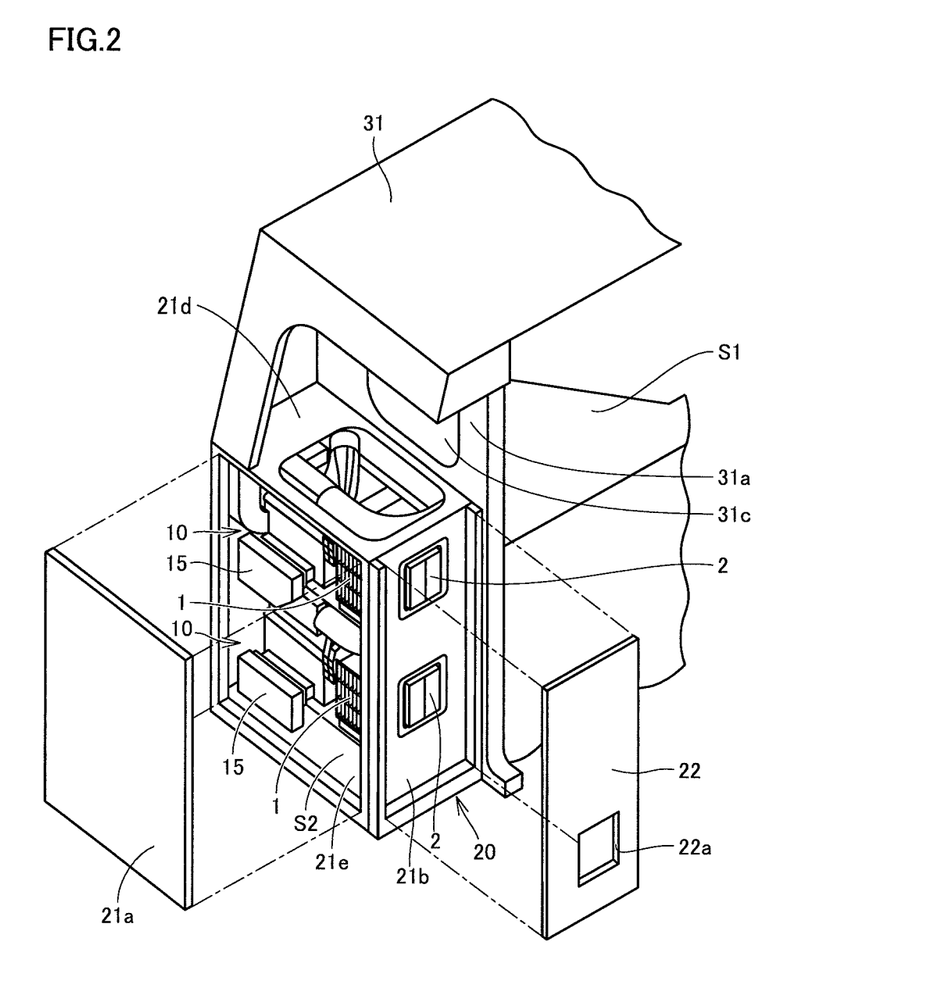
FIG. 2 is an enlarged, exploded perspective view of a rear side of an operator's compartment in the work vehicle shown in FIG. 1.
Figure 3:
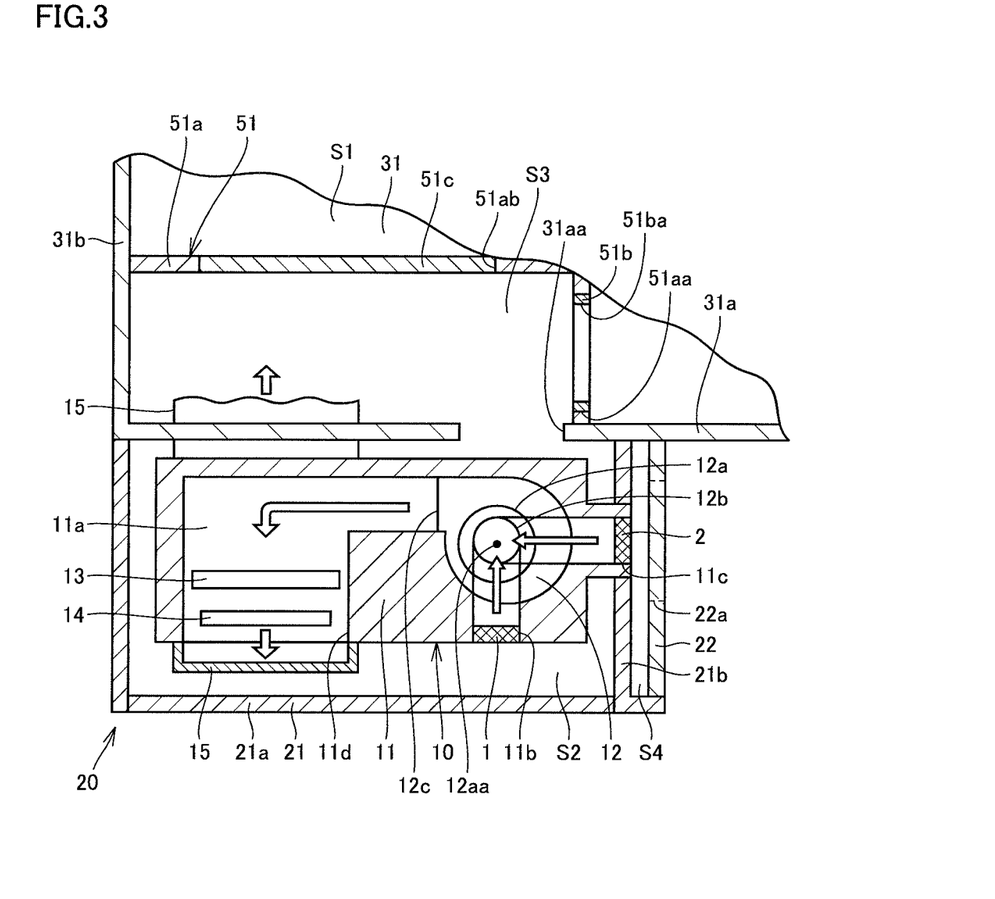
FIG. 3 is an enlarged, planar cross section showing a vicinity of an air conditioning unit shown in FIG. 2.
Figure 4:
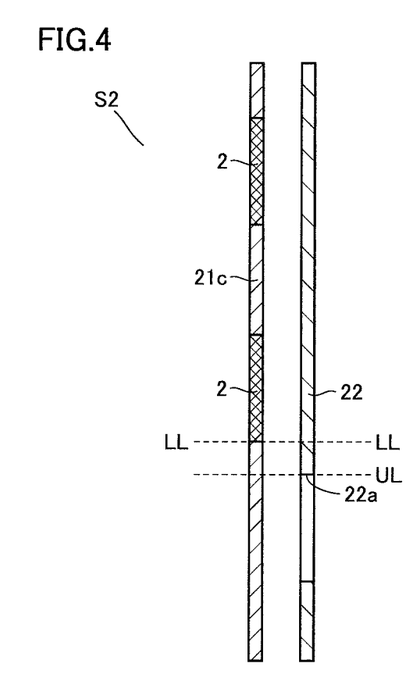
FIG. 4 is a cross section showing that an opening provided in a cover is located below a lower end of an external-air filter.
Figure 5:
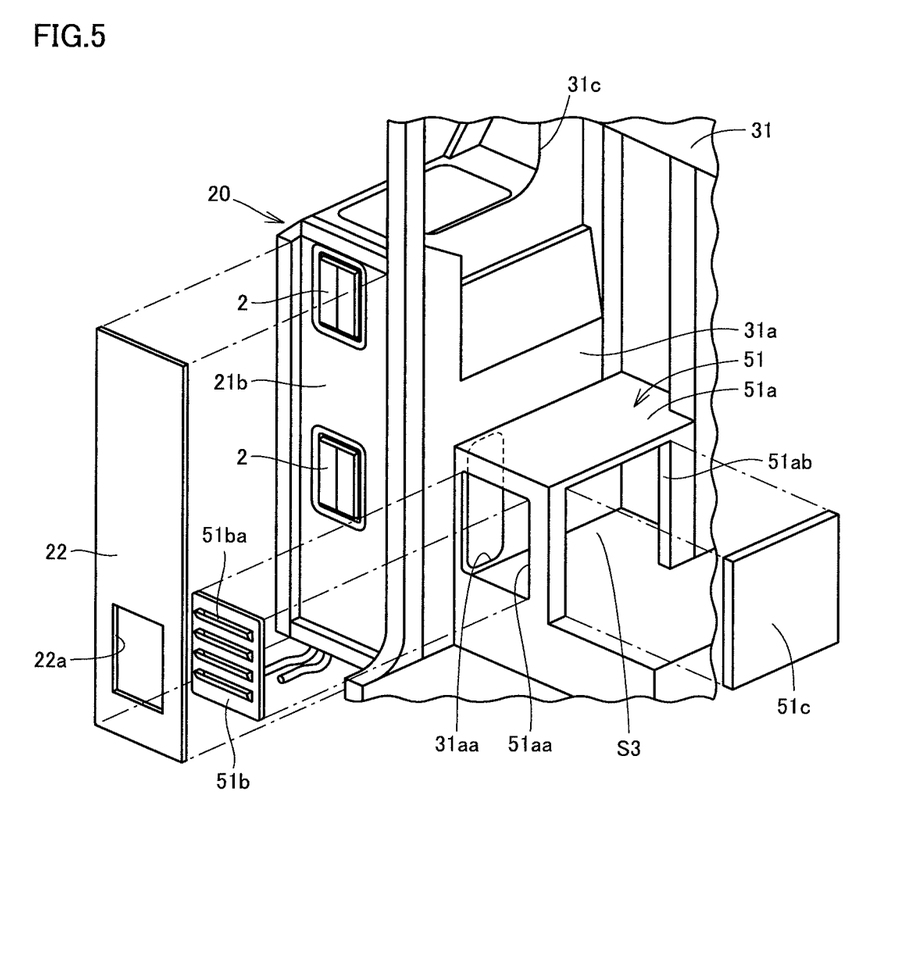
FIG. 5 is an exploded perspective view showing how the air conditioning unit located behind is seen from the interior of the operator's compartment in the work vehicle shown in FIG. 1.
Figure 6:
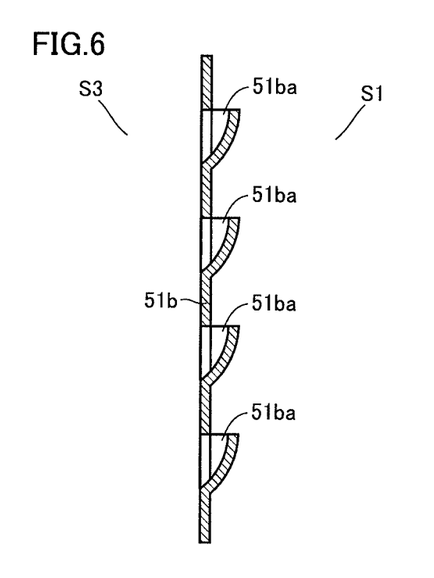
FIG. 6 is a cross section showing an opening in communication with the operator's compartment, facing upward.

FIG. 2 is an enlarged, exploded perspective view of a rear side of the operator's compartment in the work vehicle shown in FIG. 1. FIG. 3 is an enlarged, planar cross section showing a vicinity of an air conditioning unit shown in FIG. 2. FIG. 4 is a cross section showing that an opening provided in a cover is located below a lower end of an external-air filter. FIG. 5 is an exploded perspective view showing how the air conditioning unit located behind is seen from the interior of the operator's compartment in the work vehicle shown in FIG. 1. FIG. 6 is a cross section showing an opening in communication with the operator's compartment, facing upward.

As shown in FIG. 1 and FIG. 2, a rear window 31c is provided in a rear wall 31a of operator's compartment 31. Air conditioner part 20 is disposed below rear window 31c and behind rear wall 31a.

Rear window 31c and air conditioner part 20 are disposed on a left side of operator's compartment 31 (i.e., a side opposite to work implement 40 relative to operator's compartment 31). On a right side of rear wall 31a of operator's compartment 31 (i.e., a side closer to work implement 40 relative to operator's compartment 31), an opening and closing door 31d is disposed. Opening and closing door 31d can open and close an internal space S1 of operator's compartment 31 (or a first internal space) relative to an outside thereof. An operator can enter and exit internal space S1 of operator's compartment 31 via opening and closing door 31d.

Air conditioner part 20 has a case 21 and an air conditioning unit 10, 10. Case 21 has a front wall 31a, a rear wall 21a, a first sidewall 21b, a second sidewall 21c, an upper wall 21d, and a bottom wall 21e. These walls 31a, 21a-21e configure a form of a box having an internal space S2 (or a second internal space).

Front wall 31a of case 21 may be rear wall 31a of operator's compartment 31, or may be a member different from rear wall 31a of operator's compartment 31. Rear wall 21a of case 21 may be detachably attachable to another wall of case 21. In that case, rear wall 21a of case 21 may be entirely or partially detachably attachable to another wall of case 21.

First sidewall 21b of case 21 is a sidewall of case 21 closer to work implement 40. In contrast, second sidewall 21c of case 21 is a sidewall of case 21 facing away from work implement 40. Upper wall 21d of case 21 is located over internal space S2 and is also located under rear window 31c. Bottom wall 21e of case 21 is located under internal space S2.

A cover 22 is attached to a side of case 21 closer to work implement 40. Cover 22 and first sidewall 21b configure a space (a fourth internal space) S4 therebetween. Cover 22 is provided with an external-air opening 22a. This external-air opening 22a penetrates cover 22 and connects an outside of work vehicle 50 and space S4.

Air conditioning unit 10, 10 is disposed in internal space S2 of case 21. Air conditioning unit 10, 10 has a plurality of (e.g., two) air conditioning devices 10. The plurality of air conditioning devices 10 are disposed in a vertical direction relative to each other.

As shown in FIG. 3, air conditioning device 10 has an internal-air filter 1, an external-air filter 2, a casing 11, a sirocco fan 12, an evaporator 13, and a heater core 14.

Casing 11 has an internal channel 11a, an internal-air supply port 11b, an external-air supply port 11c, and an exhaust port 11d. Internal channel 11a is an air channel provided in an interior of casing 11. Internal-air supply port 11b is open to an internal space 21a of case 21 (i.e., the second internal space). Internal-air supply port 11b is for introducing the air in internal space 21a of case 21 into internal channel 11a. Internal space S2 of case 21 and internal channel 11a of casing 11 are connected by this internal-air supply port 11b.

External-air supply port 11c is open to space S4 between first sidewall 21b of case 21 and cover 22. External-air supply port 11c is for introducing air of a space external to case 21 into internal channel 11a. Internal channel 11a of casing 11 and an outside of work vehicle 50 are connected by this external-air supply port 11c.

Note that, although not shown, in internal channel 11a, a door which switches internal air to external air and vice versa is provided. By this door which switches internal air to external air and vice versa, through which one of internal-air supply port 11b and external-air supply port 11c air is introduced into internal channel 11a can be switched.

Exhaust port 11d is for exhausting air from internal channel 11a. A duct 15 is connected to exhaust port 11d. Duct 15 extends from a portion thereof connected to exhaust port 11d into internal space S1 of operator's compartment 31. Internal channel 11a of casing 11 and internal space S1 of operator's compartment 31 are connected by this duct 15. Thus, air conditioned by air conditioning unit 10 can be supplied via duct 15 to internal space S1 of operator's compartment 31.

In the above internal channel 11c, sirocco fan 12, evaporator 13, and heater core 14 are disposed. Sirocco fan 12 has an impeller 12a. Impeller 12a is rotatable about a rotation shaft 12aa. As impeller 12a rotates, sirocco fan 12 can send air that is introduced through internal-air supply port 11b and/or external-air supply port 11c to exhaust port 11d.

Evaporator 13 cools air by utilizing an evaporation heat generated by evaporating a coolant. By passing through evaporator 13 the air sent by sirocco fan 12, air's temperature, humidity and the like can be conditioned. Heater core 14 is a heat exchanger utilizing an engine cooling water. Air having passed through heater core 14 becomes warm air and is sent to internal space S1 of operator's compartment 31. Heater core 14 has a function to apply heat to remove frost adhering to evaporator 13.

Internal-air filter 1 is attached to internal-air supply port 11b of casing 11. Internal-air filter 1 is composed of a nonwoven fabric sheet, for example. Internal-air filter 1 is disposed between internal space S2 of case 21 and internal channel 11a of casing 11. Internal-air filter 1 is exposed to both internal space S2 of case 21 and internal channel 11a of casing 11.

External-air filter 2 is attached to external-air supply port 11c of casing 11. External-air filter 2 is composed of a nonwoven fabric sheet, for example. External-air filter 2 is located between internal channel 11a of casing 11 and space S4. External-air filter 2 is exposed to both internal channel 11a of casing 11 and space S4.

This space S4 is in communication with an outside of work vehicle 50 via external-air opening 22a provided through cover 22. Accordingly, it can also be said that external-air filter 2 is located between internal channel 11a of casing 11 and the outside of work vehicle 50. Thus air outside work vehicle 50 can be introduced into internal channel 11a of air conditioning device 10 via external-air opening 22a of cover 22, space S4 between first sidewall 21c and cover 22, and external-air filter 2.

As shown in FIG. 4, external-air opening 22a provided through cover 22 is located below external-air filter 2. Specifically, an upper end position UL of the above external-air opening 22a is located below a lower end position LL of external-air filter 2.

In the present embodiment, a plurality of air conditioning devices 10 are disposed in the vertical direction. In that case, upper end position UL of external-air opening 22a is located below lower end position LL of external-air filter 2 of a lowermost one of the plurality of air conditioning devices 10.

As shown in FIG. 3, rear wall 31a of operator's compartment 31 (or front wall 31a of case 21) is provided with an opening 31aa. A filter composed of a nonwoven fabric sheet etc. is not disposed at opening 31aa. Accommodation portion S1 is disposed in front of this opening 31aa.

As shown in FIG. 5, accommodation portion 51 is disposed in internal space S1 of operator's compartment 31. Accommodation portion 51 is a portion for an operator etc. to accommodate a tool etc. This accommodation portion 51 has an accommodation case 51a, an opening lid portion 51b, and a lid body 51c.

Accommodation case 51a internally has an accommodation space (a third internal space) S3. This accommodation space S3 is in communication with internal space S2 of case 21 via opening 31aa.

A sidewall of accommodation case 51a is provided with an opening 51aa. Opening lid portion 51b is attached to opening 51aa of accommodation case 51a. This opening lid portion 51b is provided with an internal-air opening 51ba. A plurality of internal-air openings 51ba may be provided through opening lid portion 51b.

As shown in FIG. 6, internal-air opening 51ba is open upward in internal space S1 of operator's compartment 31. A filter composed of a nonwoven fabric sheet etc. is not disposed at internal-air opening 51ba.

As shown in FIG. 5, a front wall of accommodation case 51a is provided with internal-air opening 51ba. Lid body 51c is attached to opening 51ab of accommodation case 51a. Lid body 51c can open and close accommodation space S3 of accommodation case 51a. By opening lid body 51c, a tool or the like can be accommodated in accommodation space S3 of accommodation portion 51.

As shown in FIG. 3 and FIG. 5, internal space S2 of case 21 is communication with internal space S1 of operator's compartment 31. Specifically, internal space S2 of case 21 is communication with internal space S1 of operator's compartment 31 via opening 31aa, accommodation space S3, and internal-air opening 51ba.

Next, a function and effect of the present embodiment will be described.

According to the present embodiment, internal-air filter 1 is attached to internal-air supply port 11b of air conditioning unit 10. Accordingly, internal channel 11a downstream of internal-air supply port 11b of air conditioning unit 10 with internal-air filter 1 attached will have a negative pressure. However, internal space S1 of operator's compartment 31 and internal space S2 in case 21 are in communication with each other, and a filter is not disposed between internal space S1 and internal space S2. Accordingly, the pressure of internal space S2 is substantially equal to the pressure of internal space S1 and does not become negative pressure relative to external air pressure. The pressure in internal space S2 of case 21 can thus be prevented from becoming a negative pressure relative to external air pressure. This suppresses entering of dust into internal space S2 of case 21 together with external air. This in turn suppresses an effect of dust on the air conditioning unit.

For example, when a setting is done such that by introduction of external air by air conditioning unit 10 the pressure of internal space S1 becomes higher than the pressure of air external to work vehicle 50 (i.e., external air), the pressure of internal space S2 of case 21 also becomes higher than the pressure of the external air. In that case, the air in internal space S2 of case 21 is going to leak outside case 21. This can further suppress entering of dust into internal space S2 of case 21.

As shown in FIG. 1 and FIG. 3, air conditioner part 20 is disposed on a side of operator's compartment 31 (i.e., a left side thereof) facing away from work implement 40 (i.e., a right side of operator's compartment 31). On the side facing away work implement 40 relative to operator's compartment 31, sandy dust easily rises as a dump truck etc. travels in a working site. Accordingly, when external-air filter 2 is exposed on a side opposite to work implement 40 relative to operator's compartment 31, sandy dust is easily sucked into air conditioning device 10 through external-air filter 2.

In contrast, in the present embodiment, as shown in FIG. 3, external-air filter 2 is exposed on the side of work implement 40 relative to operator's compartment 31. Accordingly, external-air filter 2 less easily sucks sandy dust into air conditioning device 10.

Furthermore, on a roof of operator's compartment 31 and upper wall 21d of case 21, dust (sandy dust etc.) easily builds up. Accordingly, there is a possibility that air conditioning device 10 may suck dust which falls from the roof of operator's compartment 31 and the upper surface of case 21.

In contrast, in the present embodiment, as shown in FIG. 4, upper end position UL of external-air opening 22a of cover 22 is located below lower end position LL of external-air filter 2. Accordingly, if dust should enter space S4 between sidewall 21c of case 21 and cover 22 via external-air opening 22a, the dust is not allowed to easily enter air conditioning device 10 via external-air filter 2.

Furthermore, internal-air filter 1 is disposed on a side of air conditioning device 10 (a rear side thereof) opposite to a side of air conditioning device 10 closer to operator's compartment 31 (i.e., a front side of air conditioning device 10). Thus, for example by removing rear wall 21b of case 21, internal-air filter 1 can be easily accessed from outside operator's compartment 31. This facilitates maintenance such as cleaning and replacing internal-air filter 1.

Furthermore, there is no need to access internal-air filter 1 from internal space S1 of operator's compartment 31. Accordingly, a space for accessing internal-air filter 1 is unnecessary in internal space S1. This allows internal space S1 of operator's compartment 31 to be utilized efficiently. Accordingly, accommodation portion 51 etc. can be disposed in front of air conditioner part 20 in internal space S1 of operator's compartment 31.

Furthermore, as shown in FIG. 1 and FIG. 2, air conditioner part 20 is disposed below rear window 31c of operator's compartment 31. As rear window 31c is disposed above air conditioner part 20, the operator in operator's compartment 31 can have a satisfactory rear view through rear window 31c.

Furthermore, by disposing air conditioner part 20 below rear window 31c of operator's compartment 31, opening 31aa and internal-air opening 51ba that connect internal space S2 of case 21 and internal space S1 may also be positionally below rear window 31c. In that case, dust accumulated on the floor of internal space S1 of operator's compartment 31 easily enters internal space S2 of case 21 via opening 31aa and internal-air opening 51ba.

Accordingly, as shown in FIG. 5 and FIG. 6, internal-air opening 51ba is configured to be open upward in internal space S1 of operator's compartment 31. Thus, dust accumulated on the floor of internal space S1 of operator's compartment 31 less easily enters internal space S2 of case 21 via internal-air opening 51ba.

Figure 7:
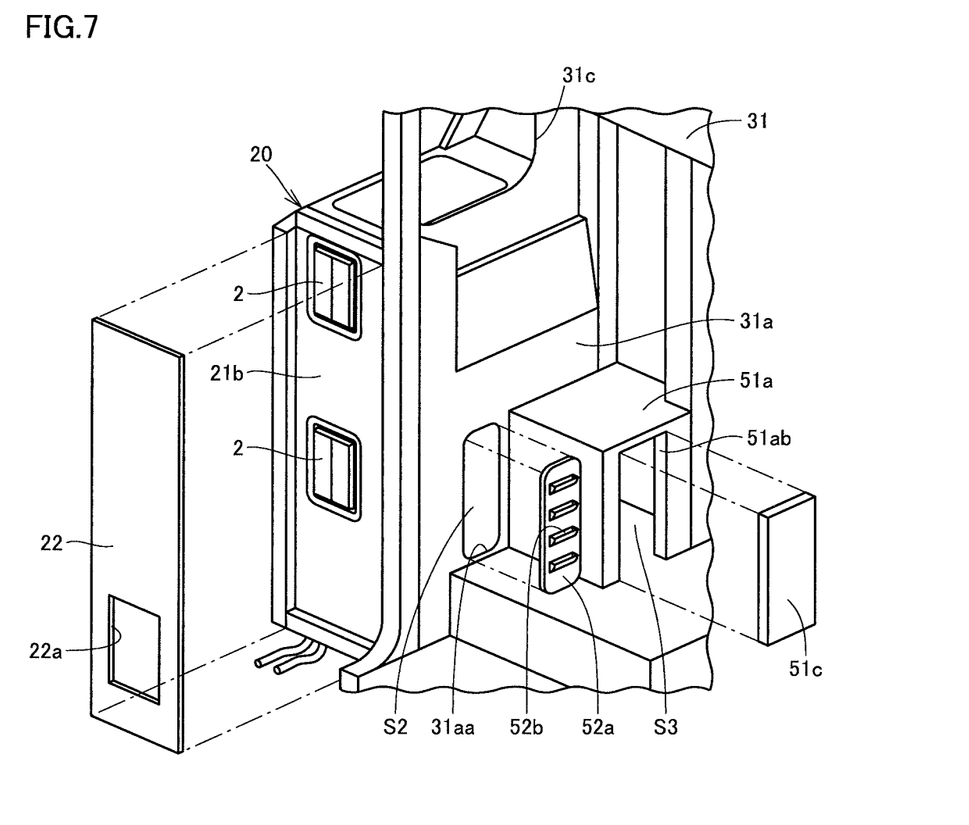
FIG. 7 is an exploded perspective view schematically showing a configuration of an exemplary variation of a work vehicle in one embodiment of the present invention.

Note that while in FIG. 5 a configuration has been described in which opening 31aa connects internal space S2 of case 21 and accommodation space S3, as shown in FIG. 7, opening 31aa may connect internal space S2 of case 21 and internal space S1 of operator's compartment 31 directly. In that case, accommodation portion 51 is disposed to avoid opening 31aa.

Furthermore, at opening 31aa, an opening lid portion 52a in which an upward opening 52b is formed may be disposed. This upward opening 52b, as well as internal-air opening 51ba as shown in FIG. 6, is open upward in internal space S1 of operator's compartment 31. Thus, dust accumulated on the floor less easily enters internal space S2 of case 21 via upward opening 52b.

Note that the configuration of the exemplary variation shown in FIG. 7 other than the above is substantially identical to the configuration shown in FIG. 1-FIG. 6, and accordingly, identical components are identically denoted and will not be described repeatedly.

Furthermore, as shown in FIG. 2, air conditioning unit 10, 10 includes a plurality of air conditioning devices 10. Thus, in a large-scale work vehicle including a plurality of air conditioning devices 10 also, an effect of dust on air conditioning unit 10, 10 can be suppressed.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

1: internal-air filter; 2: external-air filter; 10: air conditioning unit (air conditioning device); 11: casing; 11a:

internal channel; 11*b*: internal-air supply port; 11*c*: external-air supply port; 11*d*: exhaust port; 12: sirocco fan; 12*a*: impeller; 12*aa*: rotation shaft; 13: evaporator; 14: heater core; 15: duct; 20: air conditioner part; 21: case; 21*a*, 31*a*: rear wall; 21*b*: first sidewall; 21*c*: second sidewall; 21*d*: top wall; 21*e*: bottom wall; 22: cover; 22*a*: external-air opening; 30: revolving unit; 31: operator's compartment; 31*aa*, 51*aa*, 51*ab*: opening; 31*c*: rear window; 31*d*: opening and closing door; 31*e*: operator's seat; 32: engine room; 33: counter weight; 34: access system; 35: traveling unit; 36: crawler belt apparatus; 40: work implement; 41: boom; 42: dipper stick; 43: bucket; 50: hydraulic excavator (work vehicle); 51: accommodation portion; 51*a*: accommodation case; 51*b*, 52*a*: opening lid portion; 51*ba*: internal-air opening; 51*c*: lid body; 52*b*: upward opening; S1: space internal to room; S2: internal space; S3: accommodation space; S4: space.

The invention claimed is:

1. A work vehicle comprising:
an operator's compartment having a first internal space;
a case having a second internal space in communication with the first internal space;
an air conditioning unit disposed in the second internal space of the case and having an internal-air supply port to introduce air from the second internal space; and
an internal-air filter attached to the internal-air supply port.

2. The work vehicle according to claim 1, wherein:
the case is disposed outside the first internal space of the operator's compartment; and
the internal-air filter is disposed opposite to the operator's compartment with respect to the air conditioning unit.

3. The work vehicle according to claim 1, wherein:
the operator's compartment has a rear window; and
the air conditioning unit is disposed below the rear window.

4. The work vehicle according to claim 1, wherein an internal-air opening connecting the first internal space and the second internal space and being open to the first internal space is open upward in the first internal space.

5. The work vehicle according to claim 1, further comprising an accommodation portion having a third internal space, wherein
the first internal space and the second internal space are in communication with each other via the third internal space.

6. The work vehicle according to claim 1,
the air conditioning unit having an external-air supply port to introduce air from outside the case, and an external-air filter attached to the external-air supply port,
the work vehicle further comprising a cover covering the external-air filter and having an external-air opening, wherein
an upper end position of the external-air opening of the cover is located below a lower end position of the external-air filter.

7. The work vehicle according to claim 1, wherein the air conditioning unit includes a plurality of air conditioning devices.

8. An operator's compartment unit comprising:
an operator's compartment having a first internal space;
a case disposed outside the operator's compartment and having a second internal space in communication with the first internal space;
an air conditioning unit disposed in the second internal space of the case and having an internal-air supply port to introduce air from the second internal space; and
an internal-air filter attached to the internal-air supply port.

* * * * *